(12) United States Patent
Yu et al.

(10) Patent No.: US 10,200,844 B2
(45) Date of Patent: Feb. 5, 2019

(54) MASSIVE DISCOVERY OF DEVICES

(75) Inventors: Ling Yu, Oulu (FI); Vinh Van Phan, Oulu (FI); Kari Veikko Horneman, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 118 days.

(21) Appl. No.: 14/423,152

(22) PCT Filed: Aug. 23, 2012

(86) PCT No.: PCT/EP2012/066396
§ 371 (c)(1),
(2), (4) Date: Feb. 23, 2015

(87) PCT Pub. No.: WO2014/029435
PCT Pub. Date: Feb. 27, 2014

(65) Prior Publication Data
US 2015/0249914 A1  Sep. 3, 2015

(51) Int. Cl.
*H04W 8/00* (2009.01)
*H04L 12/24* (2006.01)
*H04W 4/021* (2018.01)

(52) U.S. Cl.
CPC ............. *H04W 8/005* (2013.01); *H04L 41/12* (2013.01); *H04W 4/021* (2013.01)

(58) Field of Classification Search
CPC ......... H04W 52/0203; H04W 52/0206; H04W 40/246; H04W 4/005–4/006; H04W 4/021; H04W 8/005; H04L 41/12; H04L 67/18
See application file for complete search history.

(56) References Cited

U.S. PATENT DOCUMENTS

| | | | | |
|---|---|---|---|---|
| 5,519,691 A | * | 5/1996 | Darcie | H04W 88/085 370/331 |
| 6,047,052 A | * | 4/2000 | Sakai | H04L 41/00 379/112.03 |
| 8,515,410 B1 | * | 8/2013 | Bach | H04W 52/0206 455/418 |
| 2003/0086398 A1 | * | 5/2003 | Hiltunen | H04B 1/109 370/335 |
| 2005/0123027 A1 | * | 6/2005 | Cioffi | H04B 3/32 375/222 |
| 2006/0291410 A1 | * | 12/2006 | Herrmann | H04W 4/06 370/328 |

(Continued)

FOREIGN PATENT DOCUMENTS

| | | |
|---|---|---|
| GB | 2392348 A | 2/2004 |
| GB | 2416645 A | 2/2006 |

(Continued)

*Primary Examiner* — Dung B Huynh
(74) *Attorney, Agent, or Firm* — Harrington & Smith

(57) ABSTRACT

There is provided a method, including acquiring, by a first device, information indicating a type of radio signals to detect and a predetermined time interval for the detection to take place; detecting, by a first device, that radio signals of the indicated type are transmitted from a plurality of second devices during the predetermined time interval; and estimating the amount of the second devices in a geographically limited area based on the detection of the radio signals.

17 Claims, 4 Drawing Sheets

(56) References Cited

U.S. PATENT DOCUMENTS

Figure 1:
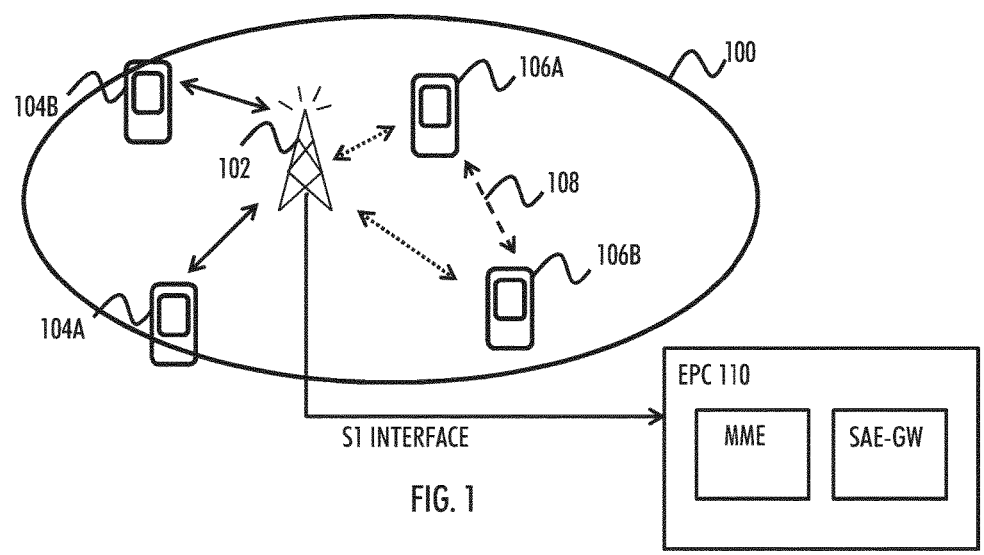

| Publication No. | Date | Name | Classification |
|---|---|---|---|
| 2008/0069088 A1* | 3/2008 | Petrovic | H04W 36/22 370/354 |
| 2010/0165882 A1* | 7/2010 | Palanki | H04W 8/005 370/254 |
| 2010/0167743 A1* | 7/2010 | Palanki | H04B 7/155 455/436 |
| 2011/0111782 A1* | 5/2011 | Aoyagi | H04W 52/0206 455/508 |
| 2011/0112768 A1* | 5/2011 | Doyle | G06Q 10/08 701/300 |
| 2011/0153805 A1* | 6/2011 | Beninghaus | H04B 17/309 709/224 |
| 2011/0170466 A1* | 7/2011 | Kwun | H04W 52/0235 370/311 |
| 2011/0171930 A1* | 7/2011 | Yoon | H04W 52/0216 455/405 |
| 2011/0176452 A1* | 7/2011 | Ishibashi | H04W 4/08 370/252 |
| 2011/0216683 A1* | 9/2011 | Ju | H04W 52/00 370/311 |
| 2011/0244866 A1* | 10/2011 | Yamamoto | H04W 36/22 455/438 |
| 2011/0258313 A1* | 10/2011 | Mallik | H04W 8/005 709/224 |
| 2011/0300887 A1* | 12/2011 | Osterling | H04W 52/0206 455/507 |
| 2012/0008512 A1* | 1/2012 | Wahlqvist | H04W 52/0232 370/252 |
| 2012/0057503 A1* | 3/2012 | Ding | H04W 24/04 370/254 |
| 2012/0106349 A1* | 5/2012 | Adjakple | H04W 52/0206 370/241 |
| 2012/0142328 A1* | 6/2012 | Awoniyi | H04W 36/22 455/418 |
| 2012/0200411 A1* | 8/2012 | Best | G08G 1/096775 340/539.13 |
| 2012/0243486 A1* | 9/2012 | Zeira | H04W 72/005 370/329 |
| 2012/0315853 A1* | 12/2012 | Lambert | H04W 8/005 455/41.2 |
| 2013/0046879 A1* | 2/2013 | Garcia | H04L 43/0811 709/224 |
| 2013/0090132 A1* | 4/2013 | Terada | H04W 4/021 455/456.1 |
| 2013/0090147 A1* | 4/2013 | Yamazaki | H04W 52/0225 455/522 |
| 2013/0095811 A1* | 4/2013 | Okino | H04W 52/0206 455/418 |
| 2013/0122893 A1* | 5/2013 | Turtinen | H04W 8/005 455/423 |
| 2013/0268654 A1* | 10/2013 | Abraham | H04W 40/246 709/224 |
| 2013/0272132 A1* | 10/2013 | Heo | H04W 28/02 370/236.2 |
| 2013/0288686 A1* | 10/2013 | Chou | H04N 21/2365 455/436 |
| 2013/0308520 A1* | 11/2013 | Damnjanovic | H04W 52/0277 370/315 |
| 2013/0324114 A1* | 12/2013 | Raghothaman | H04W 76/023 455/426.1 |
| 2014/0003262 A1* | 1/2014 | He | H04W 28/08 370/252 |
| 2014/0073311 A1* | 3/2014 | Xu | H04W 52/0206 455/418 |
| 2014/0080488 A1* | 3/2014 | Michel | H04W 52/0206 455/436 |
| 2014/0146680 A1* | 5/2014 | Wang | H04W 52/0206 370/236 |
| 2014/0274136 A1* | 9/2014 | Edge | H04W 4/04 455/456.2 |
| 2015/0131571 A1* | 5/2015 | Fodor | H04W 4/005 370/329 |
| 2015/0172856 A1* | 6/2015 | Vanderwater | H04W 4/02 455/457 |
| 2015/0319688 A1* | 11/2015 | Matas Sanz | H04W 52/0206 455/574 |

FOREIGN PATENT DOCUMENTS

| | | | |
|---|---|---|---|
| JP | WO 2011158858 A1 * | 12/2011 | ........ H04W 52/0225 |
| WO | WO-2009/146279 A1 | 12/2009 | |
| WO | WO-2010/086487 A1 | 8/2010 | |

* cited by examiner

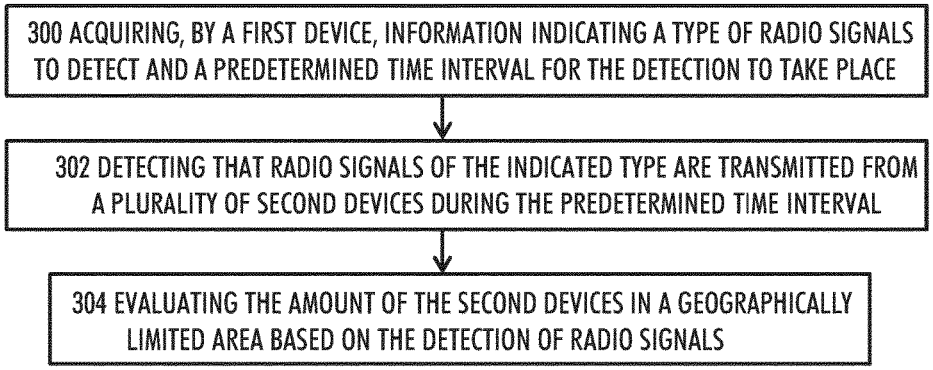
FIG. 3
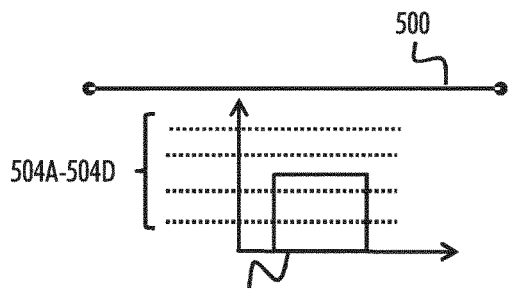
FIG. 5
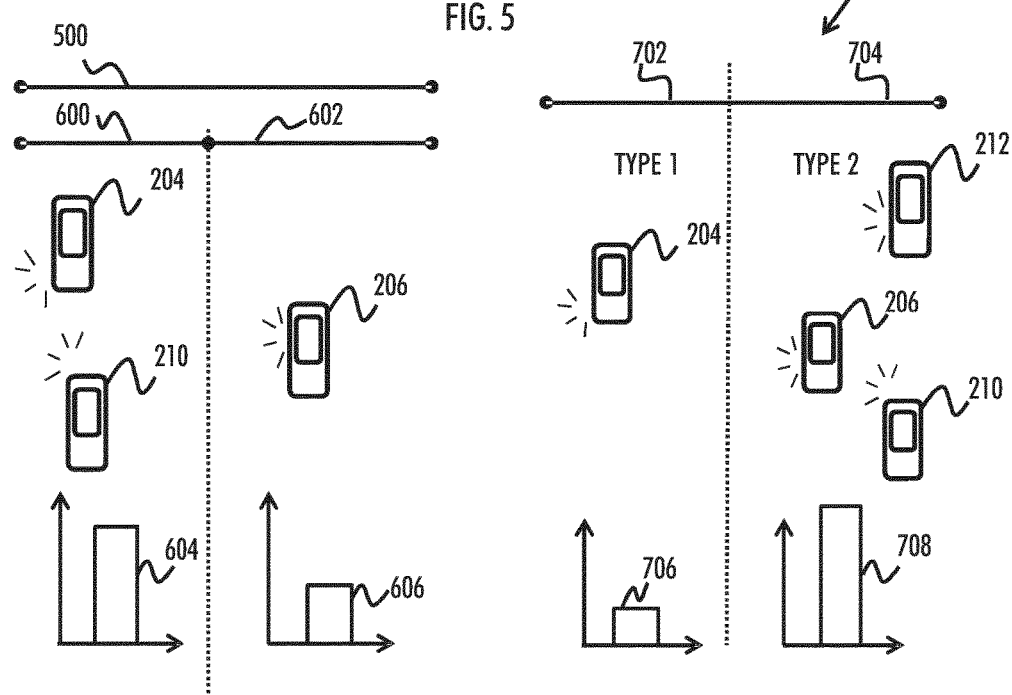
FIG. 6
FIG. 7

1

MASSIVE DISCOVERY OF DEVICES

FIELD

The invention relates generally to mobile communication networks. More particularly, the invention relates to a device discovery of a plurality of devices in proximity.

BACKGROUND

Proximity services between devices close to each other are typically applied in locations with a high density of users. Such locations may comprise airports, train stations, department stores, for example, and such locations may be identified based on statistics. However, it may be of importance to detect the presence of a plurality of devices in any given location.

BRIEF DESCRIPTION OF THE INVENTION

According to an aspect of the invention, there are provided methods comprising:
acquiring, by a first device, information indicating a type of radio signals to detect and a predetermined time interval for the detection to take place, wherein the radio signals are used for a discovery of plurality of devices in a geographically limited area with respect to the first device; detecting that radio signals of the indicated type are transmitted from a plurality of second devices during the predetermined time interval; and estimating the amount of the second devices in a geographically limited area based on the detection of the radio signals and further comprising: acquiring, by a second device, information about a radio signal which is to be transmitted during a predetermined time interval, wherein the radio signal is common among a plurality of second devices in a geographically limited area; and transmitting the radio signal in order to allow a first device to evaluate the amount of the plurality of second devices in the geographically limited area, and further comprising: causing, by a network node, a reception of information from a first device, wherein the information indicates an estimated amount of second de-vices in a geographically defined area; and deciding whether or not to activate a local service in the area and/or to activate at least one local access point in the area on the basis of the estimated amount of the second devices.

According to an aspect of the invention, there are provided apparatuses as specified in claims 17, 27, and 31.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

Figure 2:
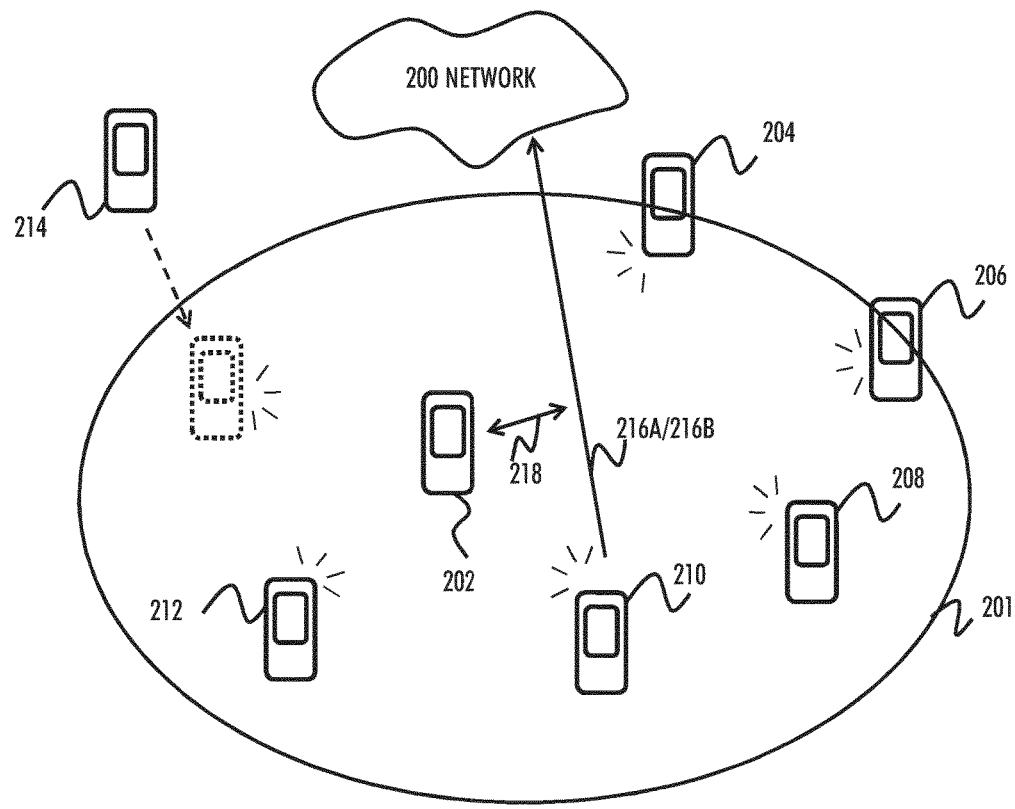
Figure 4:
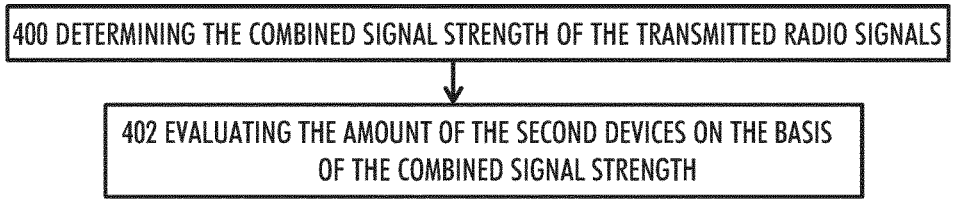
Figure 8:
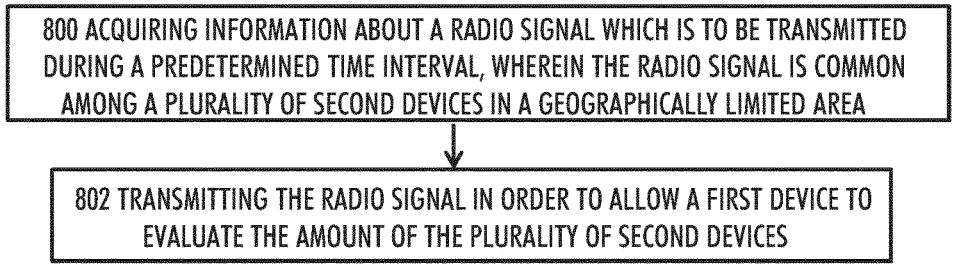
Figure 9:
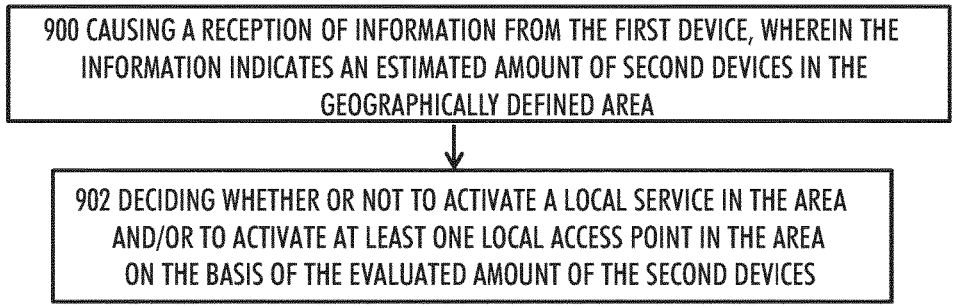
Figure 10:
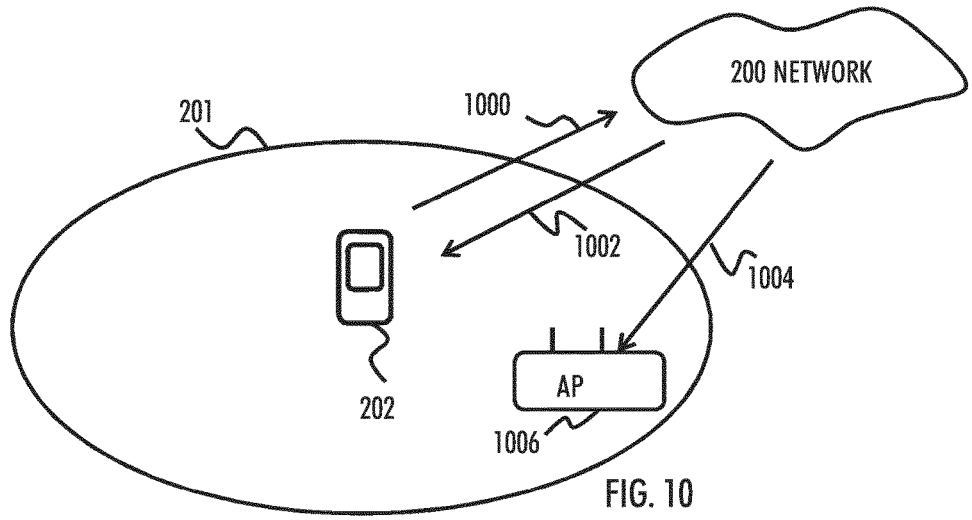
Figure 11:
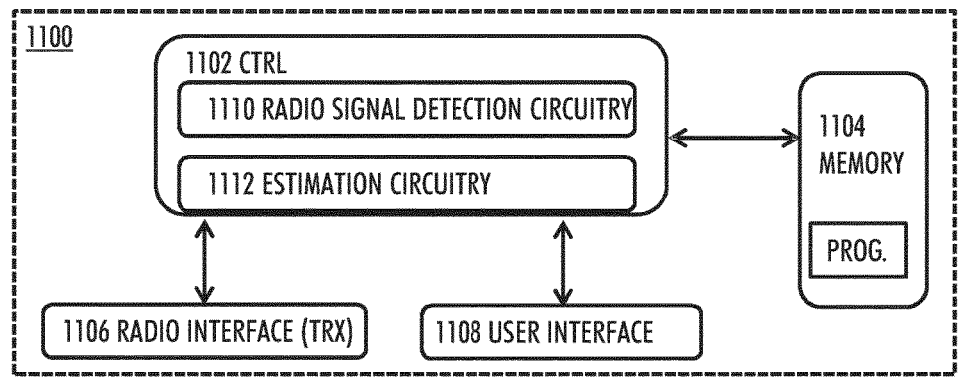
Figure 12:
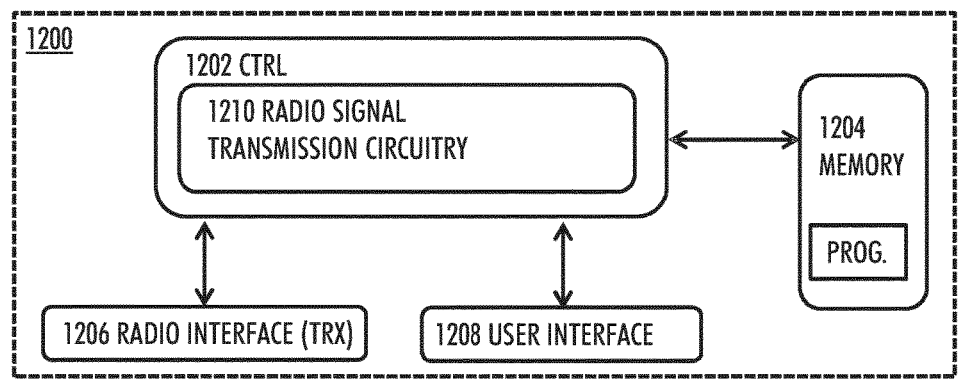
Figure 13:
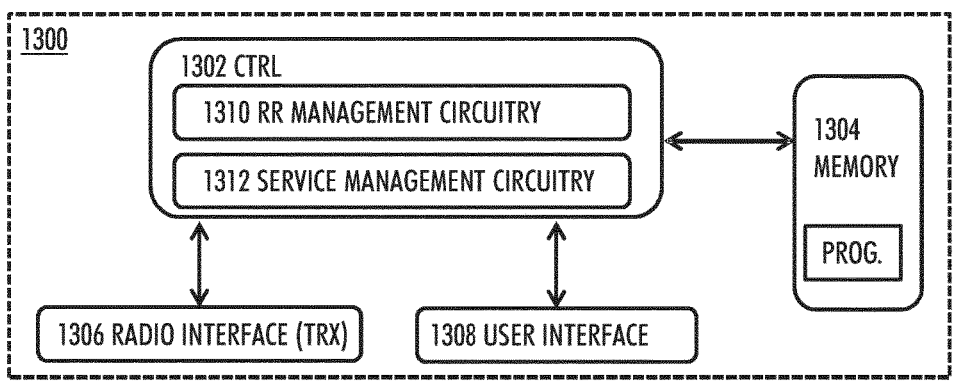

In the following, the invention will be described in greater detail with reference to the embodiments and the accompanying drawings, in which FIGS. 1 and 2 present communication networks according to some embodiments;
FIGS. 3 and 4 show methods according to some embodiments;
FIGS. 5 to 7 present examples of combined signal strength according to some embodiments;
FIGS. 8 to 9 present methods according to some embodiments;
FIG. 10 illustrates network communicating with devices, according to an embodiment;
FIGS. 11 to 13 show apparatuses according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the $3^{rd}$ Generation Partnership Project (3GPP), are typically composed of at least one base station (also called a base transceiver station, a radio network controller. a Node B, or an evolved Node B, for example), at least one user equipment (UE) (also called a user terminal, terminal device or a mobile station, for example) and optional network elements that provide the interconnection towards the core network. The base station may be evolved node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. In general, a base station may be configured to provide communication services according to at least one of the following radio access technologies (RATs): Worldwide interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. The present embodiments are not, however, limited to these protocols.

FIG. 1 shows a communication network where embodiments of the invention may be applicable. As explained, the communication network may comprise a base station 102. The base station 102 may be used in order to provide radio coverage to a cell 100. For the sake of simplicity of the description, let us assume that the base station is an eNB. In the case of multiple eNBs in the communication network, the eNBs may be connected to each other with an X2 interface as specified in the LTE. The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, evolved-UMTS terrestrial radio access network (E-UTRAN) or LTE idle mode packet buffering, etc. The MMEs and the SAE-GWs may be pooled so that a set of MMEs and SAE-GWs may be assigned to serve a set of eNBs. This means that an eNB may be connected to multiple MMEs and SAE-GWs, although each user terminal is served by one MME and/or S-GW at a time.

Still referring to FIG. 1, the eNB 102 may control a cellular radio communication link established between the eNB 102 and terminal devices 104A and 104B located within the cell 100. These communication links marked with solid arrows may be referred as conventional communication links for end-to-end communication, where the source device transmits data to the destination device via the base station 102 and/or core network. Therefore, for example, the user terminals 104A and 104B may communicate with each other via the base station 102 and EPC 110. The terminal device may be a terminal device of a cellular communication system, e.g. a computer (PC), a laptop, a palm computer, a mobile phone, or any other user terminal or user equipment capable of communicating with the cellular communication network.

In addition to or instead of conventional communication links, direct device-to-device (D2D) connections may be established among terminal devices. Direct communication links between two devices may be established, e.g., between terminal devices 106A and 106B in FIG. 1, wherein the devices may be cognitive radio-based devices 106A and 106B, for example. A direct communication link 108 marked with a dashed arrow may be based on any radio technology such that the terminal devices 106A and 106B involved in the direct communication may apply communication according to any of a plurality of radio access technologies. Terminal devices that have established a radio resource control (RRC) connection with the eNB 102 may have their D2D communication links 108 controlled by the eNB 102 as shown with dotted arrows in FIG. 1. Thus, the eNB 102 may be responsible for allocating radio resources to the direct communication link 108 as well as for the conventional communication links.

Before such direct D2D communication may take place, the user terminals may need to be aware of the presence of other user terminals capable of D2D communication. In order to enable this, a D2D discovery process may be applied. In the discovery process, the UE or user terminal (UT) capable of D2D communication applying the radio resources of the cellular communication network may, for example, inform other user terminals about the presence in proximity by transmitting the beacon/discovery signal. The other UTs may listen to such signalling and in this way also perform the D2D discovery process functions. It should be noted though, that the D2D concepts and solutions require that UEs (or UTs) applying the D2D communication 108 are D2D capable, i.e. are D2D UEs. By D2D capable it may be meant, for example, that the UT 106A and 106B are equipped with an UL receiver (Rx) for receiving data transmitted from another D2D UE by using the UL resources.

As said, in the background section, the proximity based services may benefit from acquiring knowledge of the devices in a given local area. However, such detection may be cumbersome to achieve in case there are a vast number of devices in the area. Moreover, according to the principles of self-organizing networks (SON), as one option for efficient network deployment and as a cornerstone of cognitive networks, the network should be able to learn and tune the network automatically with context-aware capabilities. However, one of the challenges for the SON is related to the measurements and their collections in order to learn the radio environment for self-configuration and self-optimization. It is envisaged that the D2D based discovery process may be taken into use for facilitating implementation of dynamic network structures with cognitive capabilities and local proximity services.

Therefore it is proposed, as shown in FIGS. 2 and 3, to acquire, in step 300 by a first device 202, information indicating a type of radio signals to detect and a predetermined time interval for the detection to take place, wherein the radio signals are used for a discovery of plurality of devices in a geographically limited area with respect to the first device. The area may be for example the area 201 as depicted in FIG. 2. The geographically limited area 201 may cover the proximity of the first device 202. Thereafter, the first device 202 may detect in step 302 that radio signals of the correct/indicated type are transmitted from a plurality of second devices 204 to 214 during the predetermined time interval. The second device 204 to 214 is different than the first device. In one example, the second device is a user terminal, whereas the first device 202 is another user terminal or an access point providing local hot spot for the area, for example. Although FIG. 2 shows only six second device 204 to 214, skilled person may appreciate that in practical situations there may be tens, hundreds or thousands of UEs present. The first device 202 may acquire such knowledge from the network or the information may be hard-coded to the device 202. The type of the radio signal may be characterized in frequency, time, space, code, content, etc.

The transmission of radio signals by the second devices 204 to 214 may be a broadcast, multicast or unicast of data, for example. Let us assume that four short lines in connection of the second devices 204 to 214 in FIG. 2 depict transmission of information. In an embodiment, the radio signal is one of the following: a common reference/beacon signal among the second devices 204 to 214 in a geographically limited area 201, an uplink data transmission 216A, an uplink sounding reference signal 216B, a dedicated D2D discovery signal. The indicated type of the radio signal may allow the devices to acquire knowledge of which of the above type(s) of radio signals to detect/transmit.

It should be noted that in case of multiple UEs 204 to 214 being present, as shown in FIG. 2, it may be cumbersome and time consuming task to identify each individual one of the UEs 204 to 214. Therefore, a specific massive discovery beacon/reference signal common among all the second devices 204 to 214 may be advantageously taken into use. Use of such common discovery signal may be advantageous as it may not be important to identify each user 204 to 214, but only to simply and efficiently detect exactly or approximately how many UEs 204 to 214 there are in proximity. Hence, the specific massive discovery beacon/reference signal, in frequency, time and/or code domain, may be defined for the D2D based massive discovery. As said, such massive discovery beacon/reference signal may be a common or general purpose one among all the UEs 202 to 214. As such it may be pre-defined or hard-coded by the standardization or broadcasted in the system information by the network 200 to the devices 202 to 214 in the area. It should be noted that the first device 202 may also acquire knowledge of the to-be-used massive discovery radio signal in order to be able to detect the transmissions of such common signal.

In an embodiment, the signal is common to all devices irrespective of the location or area where the device currently is, for example. In another embodiment, the common discovery beacon/reference signal may be a service or local area specific, therefore be configured to the UEs either via common control signaling (e.g. broadcasted in system information) or via dedicated control signaling from the network 200. The broadcast or transmission of the configuration information may take place upon detecting that UE 202 to 214 is approaching a specific area, for example, or upon detecting that certain service should be activated.

In an embodiment, the detection of the radio signal being transmitted may be based on some uplink cellular transmission 216A/216B from the second devices 204 to 214, e.g. sounding reference signal, random access channel (RACH) transmission, etc. In this case, the detection device 202 may need to use blind detection, as shown with reference numeral 218, for all possible UL transmissions in order to detect the radio signals being transmitted in the proximity. This embodiment may also allow identification of each transmitting UE 204 to 214, for example, in case each second UE 204 to 214 explicitly or implicitly indicates the transmitting source in the transmission.

In an embodiment, the detection of the radio signal being transmitted may be based on original D2D/proximity discovery beacon/reference signal from each individual UE 204 to 214. This embodiment may also allow identification of each transmitting UE 204 to 214, for example. In this case, the detection device may need to use blind detection for all possible beacon/reference signals in order to detect the radio signals being transmitted in the proximity.

For the proposed massive discovery, the first device 202 may only need to discovery the amount of devices in proximity, but not necessarily each individual one. Therefore, as defined in step 304 of FIG. 3, the first device 202 may estimate the amount of the second devices 204 to 214 in a geographically limited area 201 on the basis of the detection of the radio signals. There are various manners on how such estimated amount or number of second devices 204 to 214 may be obtained. It should also be noted that the result of the estimation/evaluation may not be an exact number of the second devices 204 to 214, but an estimate or approximation representing the number of the UEs 204 to 214. The result may not even need to be a numerical estimate but a verbal estimate may be sufficient, such as "a few devices", "a lot of devices", "couple of devices", or "tens/ hundreds/thousands of devices", to mention only a few non-limiting examples of verbal evaluation/estimation results.

In one embodiment, as shown in FIG. 4, the first device 202 may determine the combined signal strength of the transmitted radio signals in step 400 and estimate the amount of the second devices on the basis of the combined signal strength in step 402. In other words, each radio signal which is transmitted may accumulate to the received signal strength or power. In other words, the higher the received signal strength is, the more transmitting second devices 204 to 214 there are in the proximity. It is acknowledged that one second UE locating near to the detecting first device 202 may accumulate more than, for example, two second devices locating further. Therefore, the exact number of devices may be difficult to obtain with this embodiment. However, as an estimate of the amount of the second devices 204 to 214 with a certain level of probability, the signal strength may advantageously provide an efficient, an easily obtained and a non-complex parameter. The estimation result may, in the case of FIG. 2, be for example "a few devices in the proximity". This embodiment may advantageously be applied for every possible radio signal. For example, the commonly used special massive discovery reference signal known to all devices 202 to 214 may advantageously be used for this embodiment as the identity of the transmitting devices need not be known per se.

In an embodiment, the first device 202 may identify each of the second devices 204 to 214 that transmitted the radio signal on the basis of identification information comprised in the radio signals. The radio signal may in this case be, for example, a dedicated D2D discovery reference/beacon signal or an UL cellular transmission. For example, assuming the second devices 204 to 214 would each transmit such a dedicated D2D discovery signal, the detecting device 202 could identify each of the transmitting seconds UEs 204 to 214. Thereafter, the detecting UE 202 may determine the exact number of the second devices 204 to 214 on the basis of the identification. It should be noted that in this example embodiment, the detecting UE 202 may or may not determine the combined or individual signal strength(s). In this example scenario of FIG. 2, the exact number would be six (UEs 204 to 214). The dedicated D2D discovery signal may comprise information indicating that the transmitting UE is capable to perform D2D communication, for example.

As said, the detecting UE 202 may detect the radio signals during a predetermined time interval 500 of FIG. 5. As a result, in one example, embodiment, the detecting UE 202 acquires an estimation of the amount of second devices 204 to 214 by accumulating the received signal strength 502 of the detected radio signals. Alternatively, the detecting UE 202 may be seen to detect how high the received signal strength 502 at a predetermined detection frequency is and in that way automatically acquire the combined signal strength 502 of the radio signals. It should be noted that FIG. 5 depicts the detected signal strength in a rectangular form, although the detected strength during the time interval 500 may vary according to the on-going transmissions of the second devices 204 to 214. Although in an embodiment the second devices 204 to 214 are configured to transmit simultaneously, so that the detecting UE 202 is easily able to detect the highest signal strength, there may be delays in the transmissions as well as in the propagation time from the second UE to the first UE 202.

FIG. 5 also depicts example thresholds 504A to 504D, which may be predetermined based on empirical derivation or mathematical modeling, for example. The thresholds 504A to 504D may be used by the detecting UE 202 to derive the estimation of how many second UEs 204 to 214 there are. For example, determined combined signal strength 502 which exceeds the highest threshold may be understood as an indication for "a lot of second devices" being present. On the other hand, determined combined signal strength 502 which is below the lowest threshold may be understood as an indication for "a small amount of second devices" being present. Alternatively, numerical ranges may be defined based on how strong the signal strength 502 is with respect to the thresholds 504A to 504D. This embodiment may provide a simple manner for determining the approximate amount of second devices 204 to 214 in the proximity. It should be noted also that UEs which locate sufficiently far from the detecting UE 202 do not contribute to the combined signal strength 502, and thus only the second devices 204 to 214 in the proximity, such as inside the area 201 of FIG. 2, are advantageously taken into account.

However, although the embodiment of FIG. 5 is a simple and an efficient embodiment for estimating the amount of second devices 204 to 214, more accurate estimation may be obtained by embodiments described in FIGS. 6 and 7. In the embodiment of FIG. 6, the predetermined time interval 500 is divided into at least two sub-intervals 600 and 602. The information regarding the division may be hardcoded in the devices 202 to 214 or it may be signaled to the devices 202 to 214 by the network 200, for example. Thereafter, the detecting UE 202 may detect, sub-interval by sub-interval, whether or not radio signals are transmitted from at least some of the second devices 204 to 214 during a given sub-interval. For example, in the sub-interval 600, it may be detected that some of the second devices 204 to 214 do transmit as the determined signal strength in non-zero. Same analysis may be made for the second sub-interval 602. Moreover, it may be detected that the accumulated signal strength 604 is higher than the accumulated strength 606 of the radio signals transmitted in the sub-interval 602. This may be due to the fact that there are more second devices (such as devices 204 and 210 as depicted in FIG. 6) transmitting in the sub-interval 600 than in the sub-interval 602 (in FIG. 6, only the device 206 is transmitting in the sub-interval 602). As is the case in the non-divided time interval 500, also in this embodiment the detecting UE 202 may not necessarily know which specific device(s) or how many is/are transmitting but the determined combined signal strength may be a good indicator of how many second devices there are transmitting per each sub-interval.

Then, the first device 202 may, upon detecting that radio signals are transmitted in the given sub-interval 600/602, estimate the amount of the second devices transmitting during the given sub-interval 600/602 on the basis of the detection of the radio signals. This estimation may take place on the basis of the detected combined signal strength, for example. As the detecting device 202 may in this manner obtain an estimation for the number of second devices for each sub-interval 600, 602, the device 202 may then estimate the total amount of the second devices 204 to 214 on the basis of the estimations performed during the at least two sub-interval 600, 602. Such division of the time interval 500 may be beneficial because, as the total time interval 500 is divided into at least two sub-intervals, the detection of the total amount of second devices 204 to 214 may be more accurate.

It should be noted that even though the transmitting devices 204 to 214 do, in an embodiment, transmit substantially simultaneously in a synchronous manner, the detecting device 202 may nevertheless apply the sub-interval by sub-interval detection of radio signals as depicted in FIG. 6. This may be advantageous for providing more accurate estimation results because, as the second devices 204 to 214 may locate in different distances from the detecting device 202, the detected signals may arrive to the detecting device 202 at different times (i.e. at different sib-intervals). As a result, the detecting device 202 may more accurately detect how many second devices 204 to 214 are in close proximity and how many are further away. The estimation of the total amount of second devices 204 to 214 may also be improved by the use of this embodiment, as explained above with reference to FIG. 6.

FIG. 7 shows yet one embodiment on how to more accurately detect the number of second devices 204 to 214. In this embodiment, the first device 202 and the second devices 204 to 214 acquire information of at least two types of radio signals. Let us assume that there are two different types of radio signals available. This is represented by the horizontal line 700 (which may be seen as available signal space) being divided by a vertical dashed line. The two parts 702 and 704 may thus be seen to represent the two available different radio signals. The radio signals may differ in frequency domain, time domain, space domain, code domain, content, metadata, etc. As there are two types of radio signals available for the second devices 204 to 214 to broadcast/transmit, the detecting device 202 may consequently detect transmissions of at least two types of radio signals. Regarding the time domain, it should be noted that the resolution in time may be in different levels. The time domain for channel allocation may be considered in time slot- or subframe-basis or even in symbol level basis within a single system frame. However, scheduled transmission of that channel may be on the system frame basis (one or multiple thereof).

In the example FIG. 7, it is assumed that there is one of the second devices (namely device 204) transmitting the first type of radio signal 702 and three of the second devices (devices 206, 210, and 212) transmitting the second type of radio signal 704. The other devices may transmit a third, fourth, etc. type of radio signals, or stay silent (in idle mode). As a consequence, the detected signal strength 706 for the detected first type 702 of radio signals is, with a high probability, lower than the detected signal strength 708 for the detected second type 704 of radio signals. In other words, the detecting device 202 may estimate, for each type of the radio signals 702 to 704, the amount of the second devices 204 to 214 transmitting the given type of radio signal based on the detection of the given type of radio signal transmissions. Thereafter, the first device 202 may estimate the total amount second devices on the basis of the estimations performed for each of the at least two types of radio signals 702 to 704. Skilled person may appreciate that this embodiment may advantageously offer more accurate detection of the total amount of second devices 204 to 214 than an embodiment where only one type of radio signal is being transmitted by each of the second devices 204 to 214.

Relating to the transmission and detection of certain type of at least one radio signals, the first and the second devices 202 to 214 may acquire information about what type of at least one radio signal to detect and to transmit, respectively. The information may be hard-coded to the devices 202 to 214 or the network 200 may inform the devices 202 to 214 about the signal type(s) with a dedicated control signaling or with a broadcast of system information, for example. Or the devices 202 to 214 may select the signal type(s) randomly or according to the rules configured by the network 200. Again, the types of the radio signals may differ in frequency domain, time domain, space domain, code domain, content, metadata, etc. Advantageously, the detecting device 202 may disregard other types of radio signals. Therefore, it may tune its radio receiver for the detection of only certain type(s) of radio signals so that only the certain type(s) of signal(s) are detected, or simply ignore radio signals which are detected to be transmitted but are not of the correct type. By this embodiment, the detecting device 202 may not need to use any radio resources for detecting unimportant signals.

In an embodiment the detecting device 202 may detect radio signal transmissions from different directions and in that way more accurately estimate the number of second devices in the proximity. In other words, the detecting UE 202 may detect, direction by direction, whether or not radio signals are transmitted from at least some of the second devices 204 to 214 from a given direction, wherein the direction may comprise a certain range of directions in azimuth and/or elevation. Upon detecting that radio signals are transmitted from the given direction, the detecting UE 202 may estimate the amount of the second devices 204 to 214 transmitting from the given direction based on the detection of the radio signals. Thereafter, the device 202 may estimate the total amount of the second devices on the basis of the estimations performed for the different directions. For this embodiment, the detecting UE 202 may be equipped with a multiple directional receiving antenna. FIG. 7 may also be seen to represent this embodiment in case the reference numerals 702 and 704 are seen to represent different directions in the space domain 700. In an embodiment, the first device 202 may detect, signal by signal, whether or not the radio signal is received at a signal strength which is above a predetermined threshold. The threshold may be predefined based on empirical derivation or mathematical modeling, for example. This embodiment may require the detecting device 202 to be able to distinct the detected signals. One possibility for enabling this is when the transmitted radio signals comprise dedicated information allowing such individualization of signals. Thereafter, the first device 202 may determine the number of those second devices 204 to 214 whose corresponding radio signal is detected at a signal strength which is above the predetermined threshold. This embodiment may advantageously allow more accurate detection of second devices 204 to 214 which are locating within a certain distance from the detecting device 202.

In an embodiment, the detecting device 202 performs the estimation/evaluation of the amount/number of the second devices 204 to 214 periodically. However, in an embodiment, the detecting first device 202 may acquire information indicating a triggering event. Again, the detecting device 202 may acquire such information from the network 200 or the information may be hardcoded/pre-configured in the device 202. Then the device 202 may estimate the amount of the second devices 204 to 214 when the triggering event is detected to occur. Therefore, in this embodiment, the estimation of the amount of second devices 204 to 214 may be performed after the triggering event instead or in addition to the periodic manner, for example. The triggering event may be, for example, arrival to a specific area, detection of certain level of network load, etc.

In an embodiment, the network 200 may invite a certain device 202 to perform the estimation. Such invitation may be presented with a dedicated control signaling, for example. This may be beneficial if the network 200 detects that an estimation of the number of second devices 204 to 214 is needed in some specific area. One example use case could be a possible need to initiate a proximity service in the area, such as network advertising or D2D advertising.

In an embodiment, the detecting device 202 may decide to start local D2D advertising on the basis of the estimation result (i.e. how many second devices 204 to 214 there are). This may be the case when the first device 202 is configured to perform such advertising if there is enough audience present, for example. The local advertising may comprise transmission of direct D2D messages or D2D broadcasting to the second devices 204 to 214. The local advertising may comprise switching on a screen displaying advertisements for the carriers of the second devices 204 to 214 which are passing by. Thus, the estimation may be advantageously applied in detecting those situations where there is enough audience in the area and, thus, a reason to perform local advertising, display/output public safety alerts, or other proximity service (ProSe).

In an embodiment, the detecting device 202 may receive a request to report the results of the estimation to the network 200. Thereafter, the detecting device 202 may indicate the evaluated amount of the second devices 204 to 214 to the network 200. As a result, the network 200 obtains knowledge of the density of devices in a specific geographically limited area. The network 200 may then, instead of the detecting device 202, decide whether or not an actuation of a proximity service (such as local advertising) is to be performed by at least one of the devices in the area. The network 200 may then transmit an activation message to the device which is to activate some proximity service. Alternatively, the first UE 202 may indicate the evaluated amount of the second devices 204 to 214 to the network 200 without any explicit request from the network 200. E.g. the first device 202 may be pre-configured to report the results to the network 200.

As one alternative or additional service, the network 200 may decide to perform some local deployment in the area. This may comprise transmission of a command to a certain device in area to switch on to serve the second devices 204 to 214 as a local access point. The certain device may in this case be the first device 202 (which may be an UE or an access point) or one of the second devices 204 to 214 in case they have been identified.

Regarding the SON architecture, the proposed D2D based massive discovery may advantageously provide efficient means for detecting the amount of other devices in the neighborhood and thus for implying whether or not local deployment of access points should be initiated.

FIG. 8 shows an example method from the point of view of the second device 204 to 214. In step 800, the method comprises acquiring information about a radio signal which is to be transmitted during a predetermined time interval, wherein the radio signal is common among the plurality of second devices 204 to 214 in a geographically limited area 201. In step 802, the method then comprises transmitting the radio signal in order to allow the first device 202 to evaluate the amount of the plurality of second devices 204 to 214 in the geographically limited area 201.

In an embodiment, the second device 204 to 214 may acquire information indicating at least one triggering condition, wherein the triggering condition comprises at least one of the following: entry to a specific area, exceeding a certain velocity, detection of a certain level of battery, detection of certain level of network load. The second device 204 to 214 may acquire such information from the network 200 or the information may be preconfigured in the devices 204 to 214. For example, network initiated control signaling may carry information causing the second device 204 to 214 to be configured with the different triggers (e.g. depending on UE mobility velocity, UE battery status, network load, etc.) The triggering levels for the certain level of velocity, certain level of battery, certain level of network load may be obtained with empirical derivation of based on mathematical modeling, for example. Thereafter, the second device 204 to 214 may determine whether or not the at least one triggering condition is met, e.g. whether the second device 204 to 214 has entered the specific geographically defined area or not. Thereafter, upon detecting that the at least one triggering condition is met, the second device 204 to 214 may perform the transmission of the radio signal.

For example, looking at FIG. 2, it may be seen that once the second device 214 moves inside the area 201 as shown with dashed lines in FIG. 2, the device 214 may detect that the given triggering condition is met and start transmitting the radio signal. Thus, the devices 204 to 214 may advantageously be configured with triggers to broadcast the radio signal (e.g. the beacon/reference signal) only when certain conditions are met. All the relevant second devices (e.g. those which fulfill the preconfigured triggering conditions and/or would like to enjoy a certain service and/or are in certain local area) may transmit/broadcast the radio signals, such as the same beacon/reference signal, so that the selected detection device 202 may estimate the amount of second devices 204 to 214 in proximity.

In an embodiment, relating to FIG. 6, the second devices 204 to 214 may acquire an allocation of a sub-interval 600/602 of the predetermined time interval 500, wherein the predetermined time interval 500 is divided into at least two sub-intervals 600/602. The allocation may be acquired on the basis of at least one of the following: a random selection, selection based on pre-configured rules from the network 200, a reception of allocation information from the network 200. I.e. any second device may receive such allocation from the network 200 or the divided sub-intervals 600/602 may be precoded in the devices 204 to 214 and a given device may itself randomly pick one of the sub-intervals 600, 602. Alternatively, the selection may be based on a certain distribution instead of random selection. Thereafter, the second device 204 to 214 may transmit the radio signal during the allocated sub-interval 600/602. As some of the plurality of second devices 204 to 214 consequently transmit the radio signals a first sub-interval 600 while others transmit the radio signals in a second, third, fourth, etc. sub-interval 602, the determination of the approximate number of devices is more accurate.

Regarding the embodiment disclosed in FIG. 7, the second device 204 to 214 may acquire information of at least two types 702/704 of radio signals (either based on precoded information or information received from the network 200). As a consequence, the second device 204 to 214 may transmit one of the at least two types of radio signals 702/704, wherein the transmitted type 700/702 of radio signal may be based on at least one of the following: a random selection, selection based on pre-configured rules by the network 200, a reception of indication from the network 200, in a similar way as described above for the embodiment where sub-intervals 600/602 are applied.

In an embodiment, the second devices 204 to 214 all transmit the radio signal according to a predetermined synchronization. The synchronization may require the devices 204 to 214 to broadcast the signal substantially simultaneously or based on the sub-interval 600/602 related embodiment, for example.

FIG. 9 shows a method from the point of view of a network node, such as a base station, eNB, or another network element. The method comprises, in step 900, receiving information from the first device (i.e. the detecting device 202), wherein the information indicates the evaluated amount of the second devices 204 to 214 in the geographically defined area 201. Thereafter, in step 902, the network node may decide whether or not to activate a local service in the area and/or to activate at least one local access point in the area on the basis of the evaluated amount of the second devices 204 to 214. In case there is sufficiently large number of second devices 204 to 214, the network may decide to activate the local service and/or to activate at least one local access point. The definition of "sufficiently large number" may be derived from empirical experimentation or by mathematical modeling.

In an embodiment, as shown in FIG. 10, the network 200 may first cause a transmission of information to the first device 202, wherein the information requests the first device 202 to perform the estimation of the amount of the second devices 204 to 214, as shown with an arrow 1000, and to report the results of the estimation to the network 200, as shown with an arrow 1002. Alternatively, the first device 202 may be self-configured to report the results to the network 200 even without an explicit request. Thereafter, the network 200 may decide, based on the report, whether or not to transmit information to a specific device in the local area 201, as shown with an arrow 1004, wherein the information causes an activation of some local services (e.g. advertising service, content sharing service, etc.) in the local area 201 where the massive discovery has been reported. Alternatively or in addition to, the network 200 may also activate some local deployments (e.g. switch on pico or hotspot access points) to serve a group of UEs in certain local area 201.

In an embodiment, the network 200 may select and configure at least one of the UEs to make and report the massive discovery, i.e. to estimate the amount of second devices 204 to 214 in the proximity. The network 200 may perform such selection and configuration whenever it needs to discover the amount or density of devices in proximity of each other but not necessarily each individual one. Such configuration may be performed as the extension of the UE measurement configuration with additional massive discovery related information elements (e.g. the event/threshold based triggers for the massive discovery activation and report, the beacon/reference signals to be discovered, etc.). Instead of an UE performing the local discovery, in an embodiment, the network 200 may configure some special device(s) (e.g. a local advertising device, a content providing device, etc.) or a local area access point (AP) 1006 to make the massive discovery (i.e. to estimate the amount of second devices 204 to 214 in the proximity). As explained above, based on the massive discovery result, the special device(s) or local area access point(s) may decide (or be caused by the network 200) to start offering the local services or switch on to serve the local users as a local hot spot(s).

In an embodiment, the network 200 may cause a transmission of information indicating a triggering condition to the at least one second device 204 to 214, wherein each second device 204 to 214 is allowed to transmit the radio signal only when the second device 204 to 214 meets the requirements of the triggering condition, as explained earlier.

In an embodiment, the serving cellular network may advantageously maintain control of the resources of the massive discovery process. This behaviour may comprise, for example, information for determining which devices may emit the discovery signals, when and where, and what information do the discovery signals carry, etc.

FIGS. 11 to 13 provide apparatuses 1100, 1200, and 1300 comprising a control circuitry (CTRL) 1102, 1202, 1302, such as at least one processor, and at least one memory 1104, 1204, 1304 including a computer program code (PROG), wherein the at least one memory and the computer program code (PROG), are configured, with the at least one processor, to cause the respective apparatus 1100, 1200, 1300 to carry out any one of the embodiments described. It should be noted that FIGS. 11, 12, and 13 show only the elements and functional entities required for understanding a processing systems of the apparatuses. Other components have been omitted for reasons of simplicity. It is apparent to a person skilled in the art that the apparatuses may also comprise other functions and structures.

Each of the apparatuses 1100, 1200, 1300 may, as said, comprise a control circuitry 1102, 1202, 1302, respectively, e.g. a chip, a processor, a micro controller, or a combination of such circuitries causing the respective apparatus to perform any of the embodiments of the invention. Each control circuitry may be implemented with a separate digital signal processor provided with suitable software embedded on a computer readable medium, or with a separate logic circuit, such as an application specific integrated circuit (ASIC). Each of the control circuitries may comprise an interface, such as computer port, for providing communication capabilities. The respective memory 1104, 1204, 1304 may store software (PROG) executable by the corresponding at least one control circuitry The apparatuses 1100, 1200, 1300 may further comprise radio interface components (TRX) 1106, 1206, 1306 providing the apparatus with radio communication capabilities with the radio access network. The radio interface components may comprise standard well-known components such as amplifier, filter, frequency-converter, (de)modulator, and encoder/decoder circuitries and one or more antennas.

The apparatuses 1100, 1200, 1300 may also comprise user interfaces 1108, 1208, 1308 comprising, for example, at least one keypad, a microphone, a touch display, a display, a speaker, etc. Each user interface may be used to control the respective apparatus by the user.

As said, the apparatuses 1100, 1200, 1300 may comprise the memories 1104, 1204, 1304 connected to the respective control circuitry 1102. 1202. 1302. However, memory may also be integrated to the respective control circuitry and, thus, no memory may be required. The memory may be implemented using any suitable data storage technology, such as semiconductor based memory devices, flash memory, magnetic memory devices and systems, optical memory devices and systems, fixed memory and removable memory.

In an embodiment, the apparatus 1100 may comprise the terminal device of a cellular communication system, e.g. a computer (PC), a laptop, a tabloid computer, a cellular phone, a communicator, a smart phone, a palm computer, or any other communication apparatus. Alternatively, the apparatus 1100 is comprised in such a terminal device. Further, the apparatus 1100 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 1100 may be, comprise or be comprised in an access point, such as a wireless local area network or a pico area network access point. In an embodiment, the apparatus 1100 may be the first device 202, i.e. the detecting device.

The control circuitry 1102 may comprise a radio signal detection circuitry 1110 for detecting whether or not radio signals are being transmitted and for detection of the radio signals according to any of the embodiments. An estimation circuitry 1112 may be for estimating the amount of devices in the proximity on the basis of the detection of the radio signals. As a non-limiting example, the estimation may be based on the combined signal strength of the transmitted radio signals.

In an embodiment, the apparatus 1200 may comprise the terminal device of a cellular communication system, e.g. a computer (PC), a laptop, a tabloid computer, a cellular phone, a communicator, a smart phone, a palm computer, or any other communication apparatus. Alternatively, the apparatus 1200 is comprised in such a terminal device. Further, the apparatus 1200 may be or comprise a module (to be attached to the apparatus) providing connectivity, such as a plug-in unit, an "USB dongle", or any other kind of unit. The unit may be installed either inside the apparatus or attached, to the apparatus with a connector or even wirelessly. In an embodiment, the apparatus 1200 may be one of the second devices 204 to 214, i.e. a device transmitting the radio signal.

The control circuitry 1202 may comprise a radio single transmission circuitry 1210 for transmitting the radio signal according to any of the embodiments. The circuitry may also acquire allocation of the resources (such as the type of radio signal, the sub-interval to be used, etc.) for the transmission, as well as the content, frequency, etc. for the radio signal.

In an embodiment, the apparatus 1300 may be or be comprised in a base station (also called a base transceiver station, a Node B, a radio network controller, or an evolved Node B, for example). In an embodiment, the apparatus 1300 is or is comprised in the network node of the network 200.

The control circuitry 1302 may comprise a radio resource (RR) management circuitry 1310 for managing the radio resources in the massive discovery process according to any of the embodiments. For example, the circuitry 1310 may allocate the radio resources for the radio signal transmission and detection. The apparatus 1300 may also comprise service management circuitry 1312 for determining which services (local hotspot deployment, local advertising initiation, etc.) to activate on the basis of the estimated amount of devices in a certain geographically defined area.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatuses comprise processing means configure to carry out embodiments of any of the FIGS. 1 to 13. In an embodiment, the at least one processor 1102, 1202, 1302, the respective memory 1104, 1204, 1304, and the computer program code form embodiments of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor and at least one memory storing computer program code, wherein the at least one memory and the computer code are configured, with the at least one processor, to cause the apparatus to at least perform the following:
   identifying a type of radio signal characteristic of an eligible-device signal transmission originating from one or more of a plurality of access-eligible devices present in a geographic area defined with respect to a device,
      wherein an access-eligible device is a device eligible to use a local service available in the geographic area defined with respect to the device, and
      wherein the eligible-device signal transmission is used for discovery of an access-eligible device;
   identifying a predetermined time interval for detection of eligible-device signal transmissions;
   listening for eligible-device signal transmissions over the predetermined time interval; and
   estimating a prevalence of access-eligible devices in said geographic area based on detection of the eligible-device transmissions during the predetermined time interval,
      wherein the estimation is a generalized categorization of the prevalence of the access-eligible devices, and
      wherein the categorization reflects the load for providing access to the access-eligible devices.

2. The apparatus of claim 1, wherein the at least one memory and the computer program code are configured, with the at least one processor, to cause the apparatus to at least further perform the following:
   determining the combined signal strength of the eligible-device signal transmissions; and
   estimating the prevalence of the access-eligible devices on the basis of the combined signal strength.

3. The apparatus of claim 1, wherein the at least one memory and the computer program code are configured, with the at least one processor, to cause the apparatus to at least further perform the following:
   defining a division of the predetermined time interval into at least two specified sub-intervals;
   determining, sub-interval by sub-interval, whether or not eligible-device signal transmissions from at least some of the devices occur during a given sub-interval;
   in response to determining that the presence of eligible-device signal transmissions are present in the given sub-interval, estimating the prevalence of the access-eligible devices transmitting during the given sub-interval based on the detection of the radio signals; and
   estimating an overall prevalence of the access-eligible devices on the basis of the estimations performed during the at least two sub-intervals.

4. The apparatus of claim 1, wherein the at least one memory and the computer program code are configured, with the at least one processor, to cause the apparatus to at least further perform the following:
   specifying at least at least two types of radio signals to be used in eligible-device signal transmissions,
      wherein the two types of radio signals differ in at least one of the following domains:
         a frequency domain,
         a time domain,
         a space domain,
         a code domain, and
      wherein an access-eligible signal transmission uses one of the at least two types of radio signals;
   estimating, for each type of radio signal, the prevalence of the access-eligible devices transmitting the given type of radio signal based on the detection of the given type of radio signal transmissions; and
   estimating an overall prevalence of access-eligible devices on the basis of the estimations performed for each of the at least two types of radio signals.

5. The apparatus of claim 1, wherein the at least one memory and the computer program code are configured, with the at least one processor, to cause the apparatus to at least further perform the following:
   acquiring information about what type of at least one radio signal to detect; and
   disregard other types of radio signals.

6. The apparatus of claim 1, wherein the at least one memory and the computer program code are configured, with the at least one processor, to cause the apparatus to at least further perform the following:
   identifying each of the access-eligible devices from which an eligible-device discovery signal transmission originated, on the basis of identification information comprised in the eligible-device discovery signal transmission; and
   determining the exact number of the access-eligible devices on the basis of the identification.

7. The apparatus of claim 1, wherein the at least one memory and the computer program code are configured, with the at least one processor, to cause the apparatus to at least further perform the following:
   acquiring information indicating a triggering event; and in response to recognition of the occurrence of the triggering event, performing the estimation of the prevalence of the access-eligible devices.

8. The apparatus of claim 1, wherein the at least one memory and the computer program code are configured, with the at least one processor, to cause the apparatus to at least further perform the following:
indicating to the network the estimated prevalence of the access-eligible devices.

9. The apparatus of claim 1, wherein the radio signal is one of the following:
a common reference/beacon signal among the access-eligible devices in a geographically limited area,
an uplink data transmission,
an uplink sounding reference signal,
a dedicated D2D discovery signal.

10. The apparatus of claim 1, wherein the apparatus is comprised in a user terminal or an access point and the access-eligible device is comprised in another user terminal.

11. An apparatus, comprising:
at least one processor and at least one memory including a computer program code, wherein the at least one memory and the computer program code are configured, with the at least one processor, to cause the apparatus, comprised in a access-eligible device eligible to use a local service in a geographic area, to at least further perform the following, wherein the geographic area is defined with respect to a first device:
identifying a radio signal which is to be transmitted in an eligible-device signal transmission during a predetermined time interval, wherein the radio signal shares a configuration common among a plurality of access-eligible devices in the geographic area;
transmitting the eligible-device signal transmission in order to allow the first device to estimate the prevalence of access-eligible devices in the geographic area,
wherein the estimation is a generalized categorization of the prevalence of the access-eligible devices, and
wherein the categorization reflects the load for providing access to second devices.

12. The apparatus of claim 11, wherein the at least one memory and the computer program code are configured, with the at least one processor, to cause the apparatus to at least further perform the following:
acquiring information indicating at least one triggering condition, wherein the triggering condition requires at least one of the following:
entry to a specific area,
exceeding a specified velocity,
detection of a specified level of battery charge,
detection of a specified level of network load;
determining whether or not the at least one triggering condition is met; and
in response to determining that the at least one triggering condition is met, performing the transmission of the radio signal.

13. The apparatus of claim 11, wherein the at least one memory and the computer program code are configured, with the at least one processor, to cause the apparatus to at least further perform the following:
acquiring an allocation of a sub-interval of the predetermined time interval, wherein the predetermined time interval is divided into at least two sub-intervals and the allocation is acquired on the basis of at least one of the following:
a random selection,
pre-configured rules,
a reception of allocation information from the network; and
controlling the access-eligible device to transmit the eligible-device signal transmission during the allocated sub-interval.

14. The apparatus of claim 11, wherein the at least one memory and the computer program code are configured, with the at least one processor, to cause the apparatus to at least further perform the following:
acquiring information defining at least two types of radio signals, wherein the radio signals differ in at least one of the following domains: a frequency domain, a time domain, a space domain, a code domain; and
controlling the access eligible device to transmit one of the at least two types of radio signals in the eligible-device signal transmission, wherein the selection of the type of radio signal to be transmitted is based on at least one of the following:
a random selection,
pre-configured rules,
a reception of indication from the network.

15. An apparatus, comprising:
at least one processor and at least one memory including a computer program code, wherein the at least one memory and the computer program code are configured, with the at least one processor, to cause the apparatus at least to at least further perform the following:
at a network node of a telecommunications network, receiving information from a device connected to the network node,
wherein the information indicates the estimated prevalence of access-eligible devices in a geographic area defined with respect to the device,
wherein the access-eligible devices are eligible for access to a local service available in the geographic area, and
wherein the estimation is a generalized categorization of the prevalence of the access-eligible devices, wherein the categorization reflects the load for providing access to the access-eligible devices; and
based on the estimate, deciding whether or not to activate a local service in the area and/or to activate at least one local access point in the area, so as to make the local service accessible.

16. The apparatus of claim 15, wherein the at least one memory and the computer program code are configured, with the at least one processor, to cause the apparatus to at least further perform the following:
causing a transmission of information to the device, wherein the information requests the device to perform the estimation of the prevalence of the access-eligible devices and to report the results of the estimation.

17. The apparatus of claim 15, wherein the at least one memory and the computer program code are configured, with the at least one processor, to cause the apparatus to at least further perform the following:
causing transmission of information to the device and to the plurality of access-eligible devices,
wherein the information defines a configuration of an eligible-device signal transmission originating at each of the access-eligible devices, and
wherein the configuration specifies the type of radio signals to be used for the eligible-device signal transmissions by the access-eligible devices and to be detected by the device, and a predetermined time interval for the detection and transmission, respectively, to take place.

\* \* \* \* \*